United States Patent [19]

Vesper

[11] E Patent Number: Re. 31,675

[45] Reissued Date of Patent: Sep. 18, 1984

[54] HUMIDIFIER

[76] Inventor: James E. Vesper, 2408 Stratton Dr., Potomac, Md. 20854

[21] Appl. No.: 419,374

[22] Filed: Sep. 17, 1982

Related U.S. Patent Documents

Reissue of:

[64] Patent No.: 4,226,174
Issued: Oct. 7, 1980
Appl. No.: 739,882
Filed: Nov. 8, 1976

[51] Int. Cl.[3] ..... F23L 13/00

[52] U.S. Cl. ..... 98/109; 98/105; 98/100; 98/30

[58] Field of Search ..... 98/12, 17, 30, 100, 98/105, 109; 126/113, 134; 62/262; 261/104, 107

[56] References Cited

U.S. PATENT DOCUMENTS

| | | | |
|---|---|---|---|
| 3,052,416 | 2/1962 | Stephen | 261/104 |
| 3,115,447 | 12/1963 | Stengel | 29/455 |
| 3,136,017 | 6/1964 | Preziosi | 24/221 K |
| 3,159,393 | 12/1964 | Villano | 24/221 K |
| 3,169,293 | 2/1965 | Neuschotz | 24/221 K |
| 3,227,064 | 1/1966 | Spangle | 98/109 |
| 3,276,754 | 10/1966 | Skerritt | 261/104 |
| 3,673,770 | 7/1972 | Novak | 98/105 |
| 3,891,253 | 6/1975 | Revell | 292/59 |
| 3,920,144 | 11/1975 | Callen | 220/22 |
| 3,923,156 | 12/1975 | Wallestad | 206/564 |
| 4,023,691 | 5/1977 | Perel | 206/564 |

FOREIGN PATENT DOCUMENTS

| | | | |
|---|---|---|---|
| 858467 | 12/1952 | Fed. Rep. of Germany | 261/107 |

*Primary Examiner*—Henry C. Yuen
*Attorney, Agent, or Firm*—Sughrue, Mion, Zinn, Macpeak and Seas

[57] ABSTRACT

The humidifier is comprised of a substantially rectilinear container having a water reservoir in the base thereof and aligned rectilinear openings in the major front and rear surfaces. The interior surfaces of the top and bottom walls of the container are provided with parallel spaced apart grooves for removably supporting a plurality of evaporator plates of absorbent material in parallel spaced apart relation to each other perpendicular to the aligned apertures in the front and rear surfaces. The plates have a configuration to facilitate their insertion and removal through the rear aperture and guide grooves are provided on the interior surface of the front wall beneath the aperture. A hook and quick release device are provided for detachably supporting the humidifier from a standard wall type hot air register.

8 Claims, 6 Drawing Figures

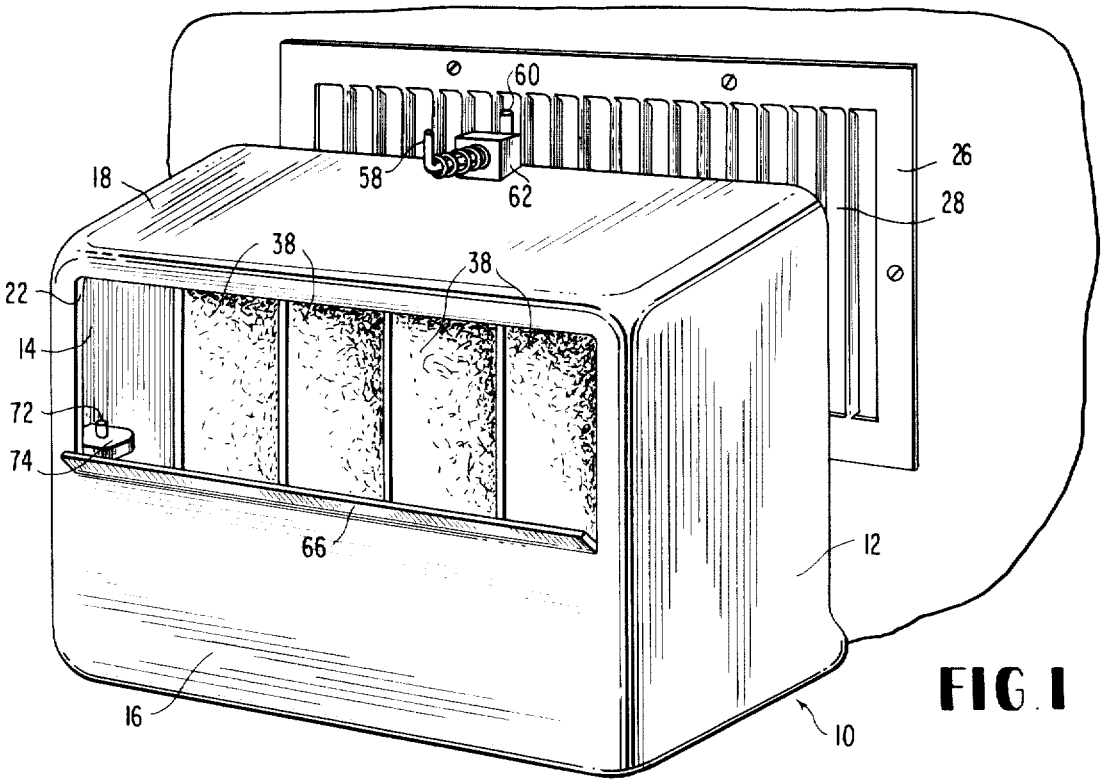
FIG. 1
FIG. 2
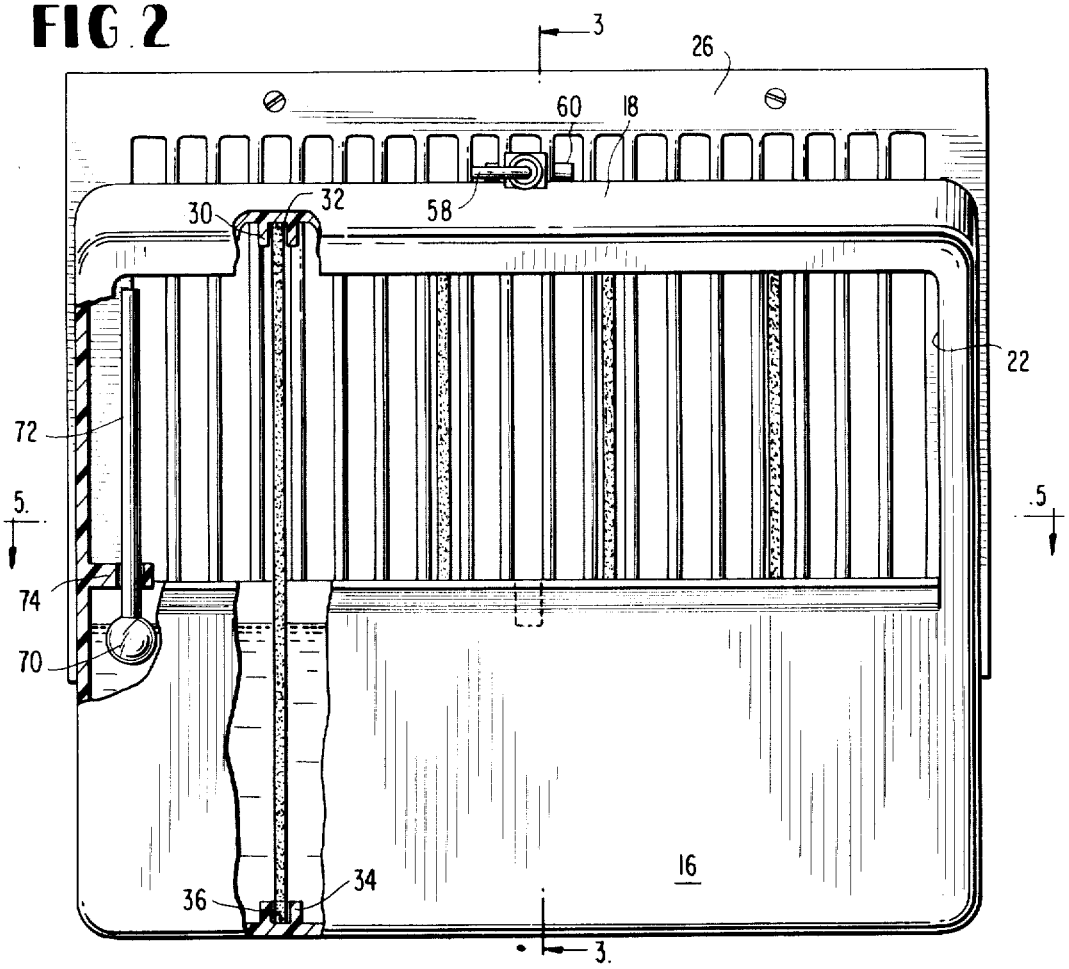

HUMIDIFIER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed to a room humidifier and more specifically to a room humidifier of the type adapted to be detachably supported from a standard wall register.

2. Prior Art

The broad idea of detachably supporting humidifiers from a hot air wall register is old and well known in the art. The simplest of these involve a simple open container of water which is detachably secured to the wall register by any suitable means so that the passage of hot air over the surface of the water will pick up some of the evaporated moisture. Other prior art devices went a step further and supported a fabric by some suitable means in the hot air path parallel to the face of the register with the lower end of the fabric disposed in the container of water. Such an arrangement however was generally unattractive and substantially impaired the flow of hot air from the register thereby decreasing the overall efficiency of the heating system. Still other prior art devices utilize free standing artificial plants having wick-type means associated therewith which were placed in the container of water so that the humidifier resembled an artificial planter. However the efficiency of such artificial flowers for assisting the transfer of moisture left much to be desired in the way of efficiency.

As opposed to the relatively open water container type humidifiers, other prior art devices provided a substantially closed container which was adapted to fit over and completely cover the wall register. Although the rear surface of such containers was substantially open the front surface consisted substantially of a plurality of closely spaced apart louvers which seriously impeded the flow of air through the humidifier. A plurality of sponge-like blocks were provided within the interior of the container to provide a capillary action for drawing water from a trough in the bottom of the container. However the use of such sponge blocks further impeded the flow of air thereby greatly reducing the overall efficiency of the heating system.

SUMMARY OF THE INVENTION

The present invention provides a room humidifier of the type adapted to be mounted on a wall type hot air register having far superior air flow characteristics and a more efficient absorbent plate arrangement which will provide the least air resistance while providing the maximum surface area for evaporation.

The present invention provides a room humidifier which can be detachably supported from a wall type hot air register having a highly visible float type refill indicator so that the condition of the water supply can be readily observed from a distance.

The present invention provides a room humidifier of the type adapted to be detachably mounted on a wall register comprising a substantially rectilinear container defining a water reservoir in the base thereof and having substantially rectilinear aligned apertures in the front and rear major surfaces above the reservoir. The apertures are substantially coextensive with the dimensions of a conventional wall register to facilitate the flow of the entire hot air supply through the humidifier. The container may be constructed of one piece molded plastic material having integral parallel grooves on the interior surfaces of the top, bottom and front walls for guiding and supporting a plurality of absorbent plates in parallel spaced apart relation to each other perpendicular to said apertures. A float is provided having a vertically disposed extension which can be visible through the front aperture or extend through the top wall of the container for indicating the water level in the reservoir. A hook is provided on the rear wall below the aperture therein for engagement with the lower edge of the wall register and a quick release latch is provided at the rear edge of the top wall for engagement with the louvers of a wall register to hold the room humidifier in place.

The foregoing and other objects features and advantages of the invention will be apparent from the following more particular description of a preferred embodiment of the invention as illustrated in the accompanying drawings.

BRIEF DESCRIPTION OF THE DRAWINGS

FIG. 1 is a perspective view of the room humidifier according to the present invention in spaced unattached relation to a conventional wall register.

FIG. 2 is a front elevation view of the room humidifier, partially broken away, with the humidifier secured to a conventional register.

DETAILED DESCRIPTION OF THE INVENTION

Figure 3:
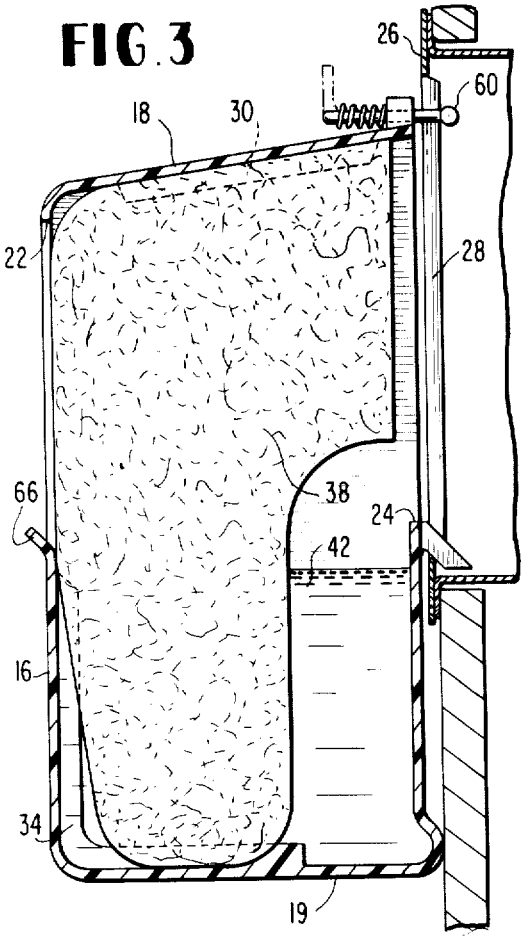
FIG. 3 is a sectional view taken along the line 3—3 in FIG. 2.
Figure 4:
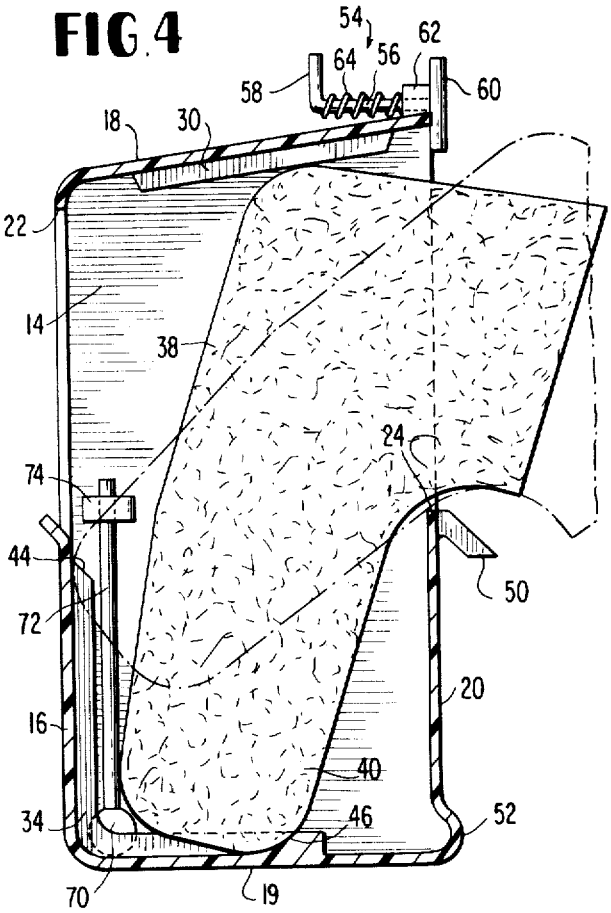
FIG. 4 is a transverse sectional view of the room humidifier per se showing the water level indicator and the manner in which the absorbent plates can be inserted and removed.

The room humidifier 10 according to the present invention is comprised of a substantially rectilinear container having side walls 12 and 14 to a front wall 16, top wall 18, bottom wall 19 and a rear wall 20. The top wall 18 may slant downwardly as best shown in FIGS. 3 and 4 and the edges may be rounded to provide a smooth streamlined appearance. The front and rear walls 16 and 20 which constitute the major surfaces of the rectilinear container are provided with substantially rectilinear apertures 22 and 24 respectively which are aligned with each other. Although the areas of these apertures are substantially coextensive the rear aperture 24 is larger and is designed to be substantially coextensive with the louver area of a conventional wall register 26. Although most conventional wall registers such as register 26 shown in FIG. 1 have louvers 28 of some sort the apertures 22 and 24 in the room humidifier according to the present invention are completely unobstructed. Thus the provision of completely open apertures in the front and rear major surfaces of the container which have an area commensurate with the louvers of a wall register greatly facilitates the efficient flow of hot air through the room humidifier.

The entire room humidifier 10 may be molded as one piece from any suitable material such as polyvinyl chloride (PVC) or the like. The inner surface of the top wall 18 is provided with a plurality of integral depending ridges 30 which define a plurality of parallel spaced apart grooves 32. A plurality of similar integral ridges 34 are formed on the interior of the front and bottom walls 16 and 19 in alignment with the ridges 30 to define a plurality of parallel spaced apart grooves 36 which are in vertical alignment with the grooves 32. These grooves 32 and 36 are adapted to receive and support a plurality of evaporation plates 38 in vertical parallel spaced apart relation to each other. The lower ends 40 of the plates 38 have a reduced width to facilitate the entry and removal of the plates into and out of the container through the rear aperture 24 as best illustrated in FIG. 4. The lower end 40 is adapted to be disposed in the lower portion of the humidifier 10 which acts as a reservoir for holding a supply of water 42. The grooves 36 which extend upwardly on the interior of the front wall 36 act as guides for the lower most ends of the plates 38 upon insertion of the plates. Thus by merely starting the plate in the upper end 44 of the grooves 36 which are readily visible through the rear aperture 24 the plates will be automatically guided downwardly into the grooves on the interior surface of the bottom wall 19. The opposite ends 46 of the grooves 36 may be closed with curved surfaces which will provide suitable abutments about which the lower ends of the plates 38 may pivot during insertion and removal.

The plates 38 may be constructed of any suitable material which will provide the requisite capillary action to wet the entire plate even though only the lower end thereof is disposed in a supply of water. The dimensions and configuration of each plate may vary but it is always desirable to obtain as much surface area on each plate above the water level while still allowing the entry and removal of the plates through the rear aperture. The number of plates may also vary with the primary consideration being the provision of as much evaporative surface area as possible without unduly restricting the flow of air through the humidifier.

An integrally molded hook-like projection 50 is provided on the rear wall 20 adjacent the center lower edge of the aperture 24. The projection 50 is adapted to extend between the louvers 28 of the hot air register 26 and engage over the lower edge of the opening in the register to support the room humidifier in operative position in front of the hot air register. The lowermost edge portion of the rear wall 20 is also bowed outwardly at 52 to engage the wall below the hot air register 26 and maintain the humidifier in a substantially vertical parallel alignment with the wall. In order to more positively secure the humidifier in place a quick release latch 54 is mounted adjacent the center rear edge of the top wall 18. The latch is comprised of a rotatable shank 56 having a bent handle portion 58 at one end and a locking cross bar 60 at the opposite end. The shank 56 is rotatably mounted in a boss 62 which is integrally molded on the top wall 18 and a spring 64 surrounds the shank 56 between the boss 62 and the operating portion 58 to normally bias the cross bar 60 toward the boss 62. The cross bar 60 is narrow enough to fit between the adjacent louvers 28 on the wall register when the cross bar 60 is vertically disposed. The cross bar can then be turned 90° to extend behind adjacent louvers 28 and hold the upper portion of the humidifier against the register. The projection 50 and latch 54 would be equally effective with a register having horizontally disposed louvers.

Figure 6:
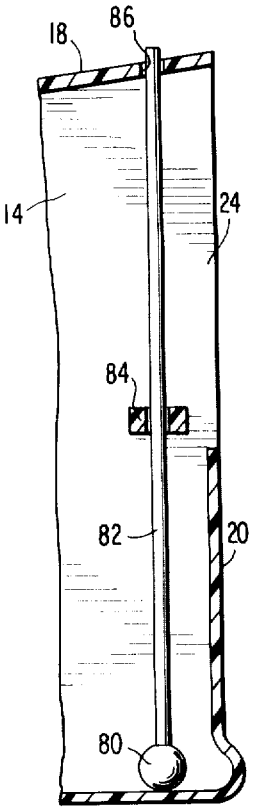
FIG. 6 is a partial vertical sectional view through a corner of the humidifier showing a modified water level indicator.
Figure 5:
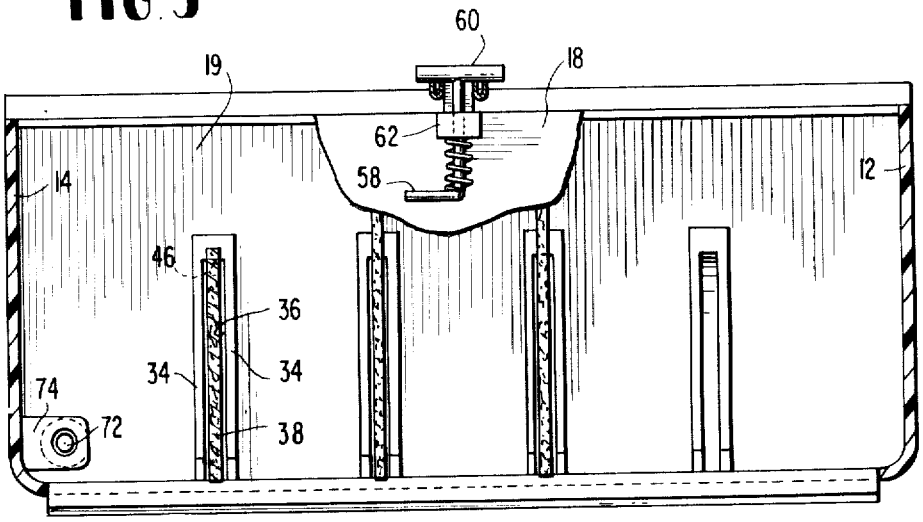
FIG. 5 is a sectional view taken along the line 5—5 in FIG. 2.

The lower reservoir portion of the humidifier 10 can be filled by any suitable means such as a flower watering can having a spout narrow enough to be inserted between the evaporation plates 38. However the humidifier could readily be filled from an ordinary drinking glass and the lower edge of the opening 22 is bent outwardly to form a lip 66 to facilitate pouring water from a broad mouth container. In order to determine the water level within the humidifier without peering into the humidifier or sticking an object into the humidifier through the front aperture 22, an operation which could be exceedingly difficult when the hot air register is located five or six feet above the floor level, a float type gage is provided. In the embodiment of FIGS. 1–5 the float 70 is provided with a vertically disposed extension 72 which is guided for vertical movement in an apertured boss 74 extending inwardly from the side wall 14 adjacent the aperture 22 in the front wall 16 so that the extension 72 will be easily visible through the aperture. The vertical extension 72 can be provided with any desirable markings which will facilitate a rapid determination as to the amount of water in the reservoir. A modified form of float is shown in FIG. 6 wherein the float 80 is provided with an extra length vertical extension 82 which is guided for vertical movement in an integrally molded apertured boss 84 extending inwardly from the side wall 14 adjacent the aperture 24 in the rear wall 20. The vertical extension 82 extends upwardly through an aperture 86 in the top wall 18 so that the extent to which the vertical extension 82 extends above the top wall 18 will provide an indication as to how much water is present in the reservoir. Suitable markings can also be provided on the vertical extension 82 to aid in this determination.

While the invention has been particularly shown and described with reference to preferred embodiments thereof it will be understood by those in the art that the foregoing and other changes in form and details may be made therein without departing from the spirit and scope of the invention.

What is claimed is:

1. A room humidifier of the type adapted to be secured to a vertically disposed wall register comprising substantially rectilinear container means having top, bottom, side, front and rear walls, said front and rear walls each having a single substantially rectilinear aperture, said apertures being aligned with each other and substantially coextensive with the upper half of said front and rear walls with the lower half of said front and rear walls in conjunction with said side walls and bottom wall defining a water reservoir, a plurality of ridges disposed on the opposing surfaces of said top and bottom walls defining vertically aligned pairs of grooves extending perpendicular to said front and rear walls, a plurality of vertically disposed ridges on the interior of the front wall beneath the aperture therein, said vertically disposed ridges being an alignment with the ridges on said bottom wall to define guide grooves which are continuous with the grooves on said bottom wall, a plurality of evaporation plates disposed in said pairs of grooves in spaced apart parallel relations to each other perpendicular to said front and rear walls, *and* means for detachably [connection] *connecting* said humidifier to said vertically disposed wall register [and float means for indicating the water level in said container].

2. A humidifier as set forth in claim 1 wherein said means for detachably securing said container to said vertically disposed wall register is comprised of hook means secured to said rear wall adjacent the lower edge of the aperture in said rear wall and latch means rotatably mounted on said top wall adjacent the rear edge thereof.

3. A humidifier as set forth in claim 2 wherein said latch means is comprised of a boss on the top wall having a horizontal bore therein, a rod rotatably disposed in said bore having a cross bar on one end, operating means on the opposite end and spring means for biasing said cross bar toward said boss.

4. A humidifier as set forth in claim 1 wherein said apertures are completely unobstructed.

5. A humidifier as set forth in claim 1 [wherein said] *further including* float means [is] comprised of a floatable base having a vertical extension and guide means for guiding said float means in said container *for indicating the water level in said container.*

6. A humidifier as set forth in claim 5 wherein said guide means is comprised of an apertured boss on the interior of said container adjacent said front aperture through which said vertical extension is guided.

7. A humidifier as set forth in claim 5 wherein said guide means is comprised of an aperture in the top wall of said container in which said vertical extension is guided.

8. The room humidifier of the type adapted to be secured to a vertically disposed wall register comprising substantially rectilinear container means having top, bottom, side and front and rear walls, said front and rear walls each having a single substantially rectilinear unobstructed aperture, said apertures being aligned with each other and substantially co-extensive with the upper half of the front and rear walls with the lower half of said front and rear walls in conjunction with said side walls and bottom wall defining a water reservoir, a plurality of ridges disposed on the opposing surfaces of said top and bottom walls defining vertically aligned pairs of grooves extending perpendicular to said front and rear walls, a plurality of vertically disposed ridges on the interior of the front wall beneath the aperture therein, said vertically disposed ridges being in alignment with the ridges on said bottom wall to define guide grooves which are continuous with the grooves on said bottom wall, a plurality of evaporation plates disposed in said pairs of grooves in spaced apart parallel relation to each other perpendicular to said front and rear walls, means for detachably securing said humidifier to said vertically disposed wall register comprising hook means secured to the rear wall adjacent the lower edge of the aperture in said rear wall and latch means rotatably mounted on said top wall adjacent the rear edge thereof, said latch means comprising a boss on said top wall having a horizontal bore therein, a rod rotatably disposed in said bore having a cross-bar on one end, operating means on the opposite end and spring means for biasing said cross-bar toward said boss, and float means for indicating the water level in said container comprising a floatable base having a vertical extension and guide means for guiding said float means in said container.

* * * * *